(12) United States Patent
Baskar et al.

(10) Patent No.: US 7,752,760 B2
(45) Date of Patent: Jul. 13, 2010

(54) PORTABLE TRIMMER HAVING ROTATABLE POWER HEAD

(75) Inventors: Ashok Samuel Baskar, Lutherville, MD (US); Wallis Alsruhe, Manchester, MD (US); Jason Busschaert, Towson, MD (US); Kevin W. Covell, Parkton, MD (US); Wade C. King, Finksburg, MD (US)

(73) Assignee: Black & Decker, Inc., Newark, DE (US)

( * ) Notice: Subject to any disclaimer, the term of this patent is extended or adjusted under 35 U.S.C. 154(b) by 1145 days.

(21) Appl. No.: 11/169,748

(22) Filed: Jun. 30, 2005

(65) Prior Publication Data

US 2007/0000138 A1 Jan. 4, 2007

(51) Int. Cl.
*B25G 3/00* (2006.01)
*B23D 51/01* (2006.01)
*B26B 27/00* (2006.01)
*B26B 19/12* (2006.01)

(52) U.S. Cl. .................. 30/517; 30/296.1; 30/210; 30/340; 30/519

(58) Field of Classification Search ........... 30/210–214, 30/296.1, 340, 342, 344, 392–394, 517, 519; D8/8; 439/32, 502, 575
See application file for complete search history.

(56) References Cited

U.S. PATENT DOCUMENTS

| | | | | | |
|---|---|---|---|---|---|
| 2,909,068 | A | * | 10/1959 | Haug | 30/296.1 |
| 3,597,842 | A | | 8/1971 | Greene | |
| 3,657,813 | A | * | 4/1972 | Knight | 30/296.1 |
| 4,145,810 | A | * | 3/1979 | Belliston | 30/296.1 |
| 4,207,675 | A | * | 6/1980 | Causey et al. | 30/296.1 |
| 4,359,822 | A | * | 11/1982 | Kolodziejczyk | 30/296.1 |
| 4,515,423 | A | | 5/1985 | Moore et al. | |
| 4,638,562 | A | * | 1/1987 | Drake | 30/296.1 |
| 4,651,420 | A | * | 3/1987 | Lonnecker | 30/296.1 |
| 4,733,470 | A | * | 3/1988 | Firman | 30/296.1 |
| 4,760,646 | A | * | 8/1988 | Siegler | 30/275.4 |

(Continued)

FOREIGN PATENT DOCUMENTS

DE 39 02 700 C2 8/1990

(Continued)

*Primary Examiner*—Jason Daniel Prone
(74) *Attorney, Agent, or Firm*—Kramer & Amado P.C.

(57) ABSTRACT

A portable, hand-operated trimmer has a head module that is removably connected to a power control module. The head module has a power head enclosing an electric motor that is operatively connected to a trimming blade. The power head is selectably settable in a plurality of angular positions with respect to a head support, including a neutral position representing 0 degree rotation, 45 degree flexion and dorsiflexion positions, and 90 degree flexion and dorsiflexion positions. The power head also encloses a stator cartridge that is connected to the housing of the power head by a plurality of fastening members. The head support rotates about the stator cartridge and is engaged by way of a movable engagement pin that is received within a selected recess defined in the stator cartridge. The power head housing and stator cartridge further define molded sockets to receive corresponding pivot arms of the head support. An O-ring is disposed about one of the pivot arms to dampen free rotation. The power control module provides power to the power head through a removable rechargeable battery or through direct connection to conventional household power.

11 Claims, 12 Drawing Sheets

U.S. PATENT DOCUMENTS

| | | | |
|---|---|---|---|
| 4,916,818 A * | 4/1990 | Panek | 30/296.1 |
| 5,079,841 A | 1/1992 | Ohkanda | |
| 5,261,162 A | 11/1993 | Siegler | |
| D353,751 S * | 12/1994 | Germano | D8/8 |
| 5,411,238 A | 5/1995 | Caron | |
| 5,544,418 A * | 8/1996 | Harada | 30/210 |
| 5,687,483 A * | 11/1997 | Neubert et al. | 30/519 |
| 5,787,536 A * | 8/1998 | Pate | 30/296.1 |
| 5,809,653 A | 9/1998 | Everts et al. | |
| 5,832,611 A * | 11/1998 | Schmitz | 30/392 |
| 5,884,403 A * | 3/1999 | Rogers | 30/296.1 |
| 5,926,961 A * | 7/1999 | Uhl | 30/296.1 |
| 6,138,364 A * | 10/2000 | Schmitz | 30/392 |
| 6,182,367 B1 | 2/2001 | Janczak | |
| 6,192,769 B1 | 2/2001 | Stark | |
| D447,924 S * | 9/2001 | Neitzell et al. | D8/61 |
| 6,488,511 B1 * | 12/2002 | Stewart | 30/296.1 |
| 6,610,946 B2 * | 8/2003 | Covell et al. | 200/17 R |
| 6,651,347 B2 * | 11/2003 | Uhl | 30/296.1 |
| 6,656,626 B1 * | 12/2003 | Mooty et al. | 30/500 |
| 6,671,969 B2 * | 1/2004 | Phillips et al. | 30/392 |
| 6,701,622 B2 * | 3/2004 | Covell et al. | 30/210 |
| 6,735,873 B2 * | 5/2004 | Langhans et al. | 30/210 |
| D500,431 S * | 1/2005 | Gice | D8/8 |
| D506,653 S * | 6/2005 | Elsworthy | D8/8 |
| 6,901,695 B2 * | 6/2005 | Lindroth | 30/290 |
| 7,093,366 B2 * | 8/2006 | Black | 30/296.1 |
| D528,382 S * | 9/2006 | Baskar et al. | D8/8 |
| D536,585 S * | 2/2007 | Baskar et al. | D8/8 |
| 7,370,423 B1 * | 5/2008 | Huang | 30/199 |
| 7,484,300 B2 * | 2/2009 | King et al. | 30/296.1 |
| 7,540,093 B1 * | 6/2009 | Yeh | 30/296.1 |
| D596,000 S * | 7/2009 | Klingbeil | D8/8 |
| 2002/0194739 A1 * | 12/2002 | Krane et al. | 30/296.1 |
| 2003/0110645 A1 * | 6/2003 | Phillips et al. | 30/392 |
| 2003/0136003 A1 * | 7/2003 | Casttelmani | 30/100 |
| 2004/0237228 A1 * | 12/2004 | King et al. | 15/50.1 |
| 2006/0048397 A1 * | 3/2006 | King et al. | 30/296.1 |
| 2007/0193038 A1 * | 8/2007 | Dahlberg | 30/296.1 |
| 2007/0234579 A1 * | 10/2007 | Patrick | 30/517 |
| 2009/0277017 A1 * | 11/2009 | Reiss et al. | 30/210 |

FOREIGN PATENT DOCUMENTS

| | | |
|---|---|---|
| DE | 40 21 277 C2 | 3/1991 |
| DE | 41 16 885 C2 | 12/1991 |
| DE | 43 32 986 C2 | 3/1995 |
| DE | 29508203 U1 * | 9/1995 |
| DE | 197 53 361 C2 | 6/1999 |
| DE | 199 26 375 A1 | 12/2000 |
| EP | 0 136 278 B1 | 5/1989 |
| EP | 0 521 806 B1 | 11/1994 |
| EP | 0 422 773 B1 | 11/1995 |
| EP | 0 768 138 A2 | 4/1997 |
| EP | 0 834 248 B1 | 4/1998 |
| EP | 0822036 B1 * | 5/2003 |
| EP | 1397955 A2 * | 3/2004 |
| EP | 1738638 A1 * | 1/2007 |

* cited by examiner

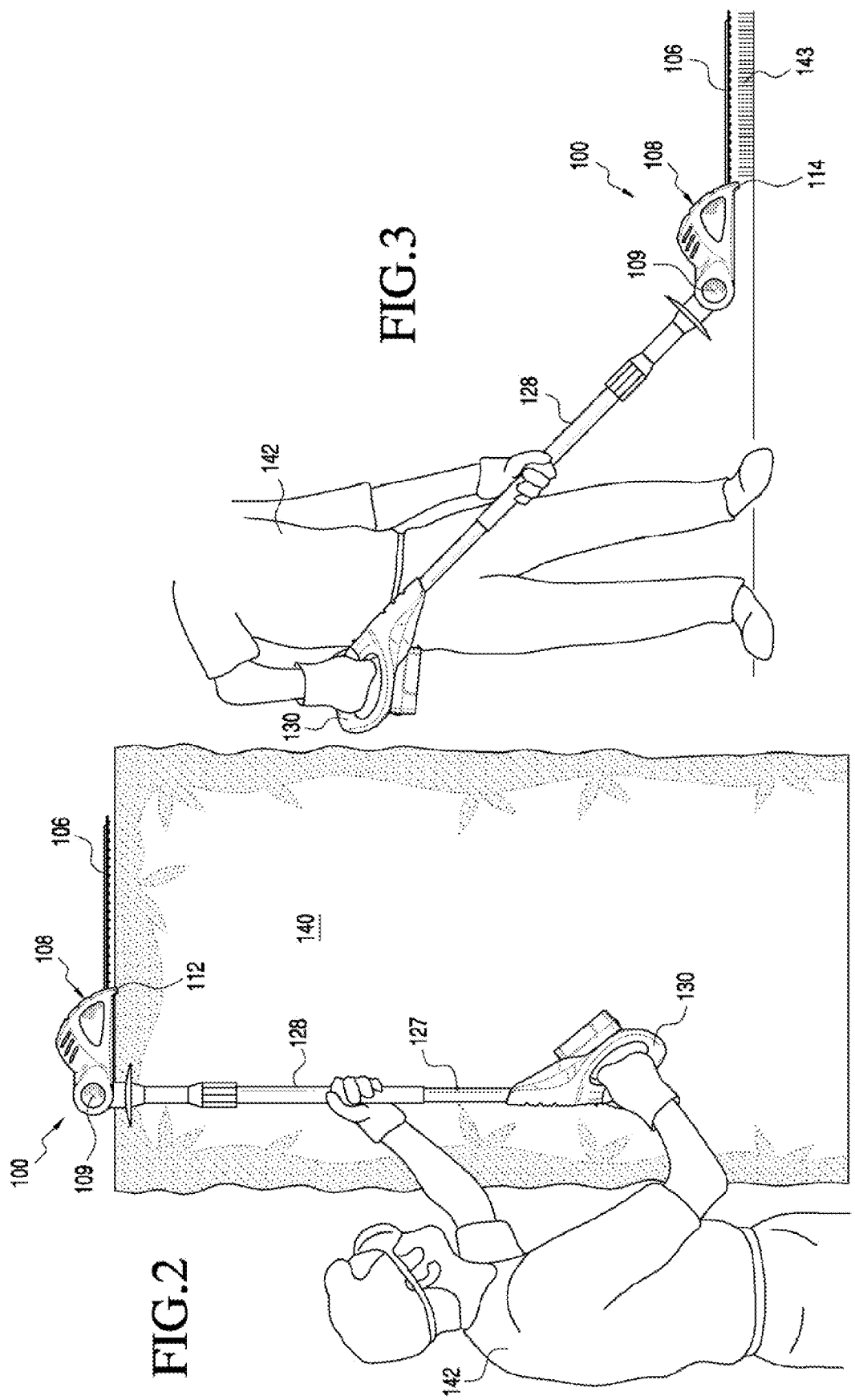

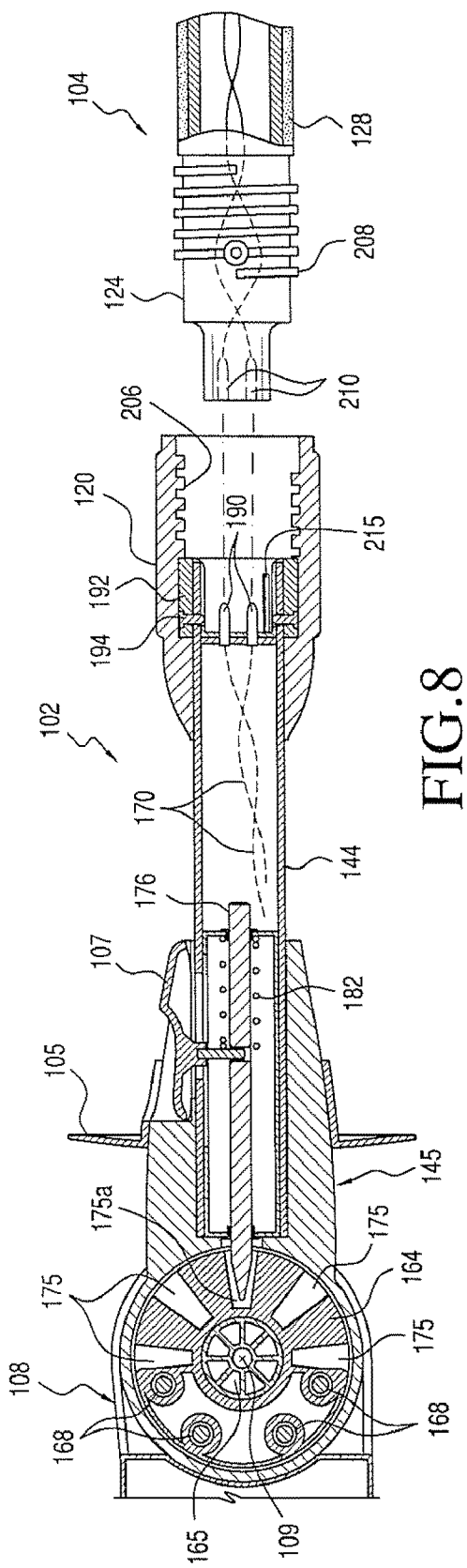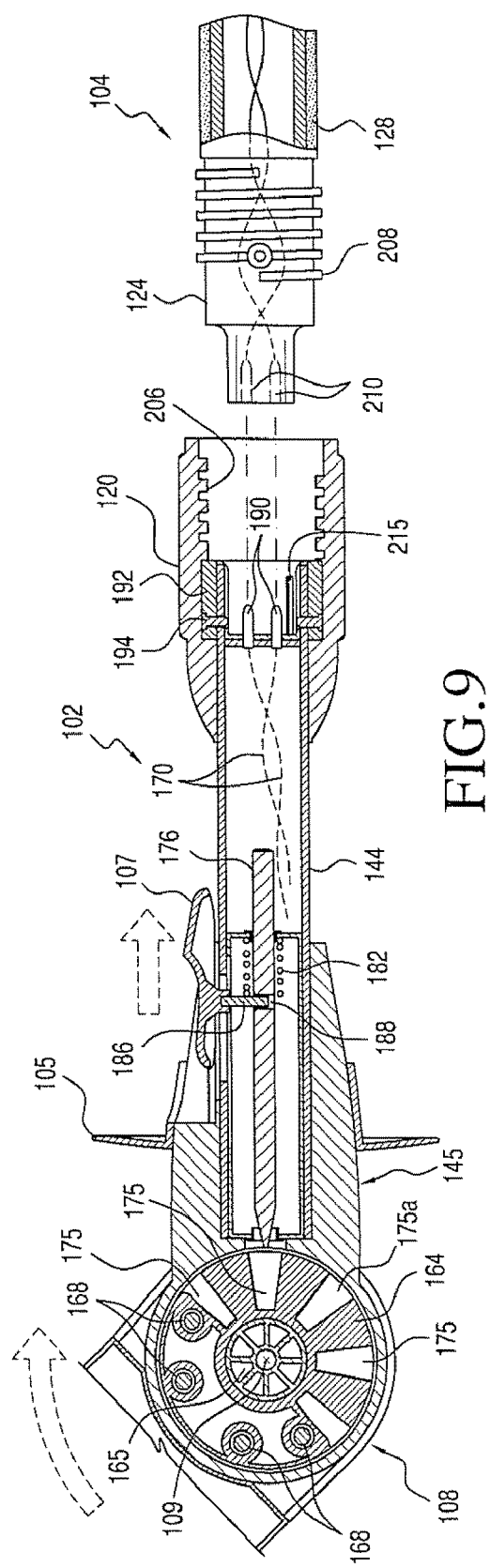

PORTABLE TRIMMER HAVING ROTATABLE POWER HEAD

FIELD OF THE INVENTION

The present invention generally relates to hand-held outdoor power tools. More particularly, the present invention relates to portable hedge trimmers having a rotatable power head that is selectively settable in a plurality of positions.

BACKGROUND OF THE INVENTION

Hedges are traditionally planted to define property boundaries, increase privacy, and provide shelter from prevailing winds. These hedges may achieve a formal appearance through proper cultivation, and can be trimmed as medium height hedges at 6-8 ft. or grown as taller screens or windbreaks easily exceeding 12 ft. If not pruned properly, the hedges may quickly become overgrown and unmanageable. The hedgerow top and sides are traditionally trimmed up to several times a year in the growing season, to maintain the hedge's shape.

Trimming the tops and sides of larger hedges can easily become cumbersome and time consuming. Cultivation with traditional hand-held trimmers requires the operator to mount a ladder to reach the hedge tops. The ladder must be continually repositioned along the hedgerow for proper trimming. For exceptionally wide hedgerows, the operator must repeat the trimming operation along alternate sides. Trimmers requiring use of an outdoor extension cord present additional challenges for tall hedgerows because the cord may become entangled with the operator and ladder. Moreover, conventional eight foot home ladders may be inadequate for proper operator support during trimming of exceptionally large hedges. Combustion driven hedge trimmers present additional obstacles to the operator due to increased weight, noise, and the burdens associated with the use of liquid fuel. Battery technology has recently advanced to be capable of providing sufficient electrical energy to hand-held outdoor power tools, eliminating the need for a power cord or a combustion engine. An example of a rechargeable battery used in conjunction with a power tool is disclosed in U.S. Pat. No. 6,412,572, which is hereby incorporated by reference.

Furthermore, proper trimming of the top and bottom of the hedges may require cutting at angles to achieve the proper appearance. This would force a user to climb a ladder to reach the top portion of the hedge or bend down to access the bottom portion of the hedge. Both of these options are cumbersome and burdensome for a user.

Accordingly, there remains a need for a portable trimmer to easily and safely trim a variety of plant life, including large hedges and hedgerows, small twigs and the like. There also remains a need for a portable trimmer that allows cutting at various angles to better achieve the proper hedge appearance.

SUMMARY OF THE INVENTION

In one preferred form, the present invention provides a portable, hand-operated trimmer having a head module that is removably engaged with a, power control module. The head module has a power head with a housing enclosing an electric motor and partially enclosing a trimming blade. The trimming blade is operatively coupled to the electric motor and reciprocates to provide a cutting action. The power head of the head support is selectably settable in a plurality of angular positions with respect to the head support by releasing a latch that is disposed on the head support. The angular positions include a neutral position representing 0 degree rotation, a 45 degree position and a 90 degree position.

The power head has a stator cartridge that is disposed within and statically connected to the housing of the power head by a plurality of fastening members. The head support rotates about the stator cartridge and is engaged by way of a movable engagement pin that is received within a selected recess of plural recesses defined in the stator cartridge. The latch of the head support is slidably mounted to an external surface of the head support and is connected to the engagement pin such that movement of the latch engages the pin with the selected recess. The head support is molded to define a chamber for partially enclosing the stator cartridge, and molded to define a first and second pivot arms that rotate about an axis. The first pivot arm is received within a molded socket defined by the housing of the power head. The second pivot arm is received within a molded socket defined by the stator cartridge. An O-ring is disposed about the second pivot arm to increase friction contact with the stator cartridge and thereby diminish free rotation about the axis.

The power control module releasably engages with the head module and provides a source of power and control for the portable trimmer. The power control module has a control handle assembly that provides a source of electrical power and has an elongated boom that releasably engages with a coupling module of the power head. Electrical power is provided by way of a rechargeable battery or through direct connection of a power cord to conventional household power. The battery is disengaged from the control handle assembly for charging by an external charging unit.

Further areas of applicability of the present invention will become apparent from the detailed description provided hereinafter. It should be understood that the detailed description and specific examples, while indicating the preferred embodiments and best mode of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

FIG. 2 illustrates the portable trimmer in a hedge trimming operation;

FIG. 3 illustrates the portable trimmer in a grass trimming operation;

FIG. 8 is a sectional view of the head module with the power head locked in the neutral position, and a sectional view of the power control module poised for connection thereto;

FIG. 9 is a sectional view of the head module and power control module illustrated in FIG. 8 with the power head unlocked for dorsiflexion rotation;

FIG. 19 is a perspective view of a power cord being connected to the power control module according to an alternate embodiment of the present invention.

DETAILED DESCRIPTION OF THE PREFERRED EMBODIMENTS

Figure 1:
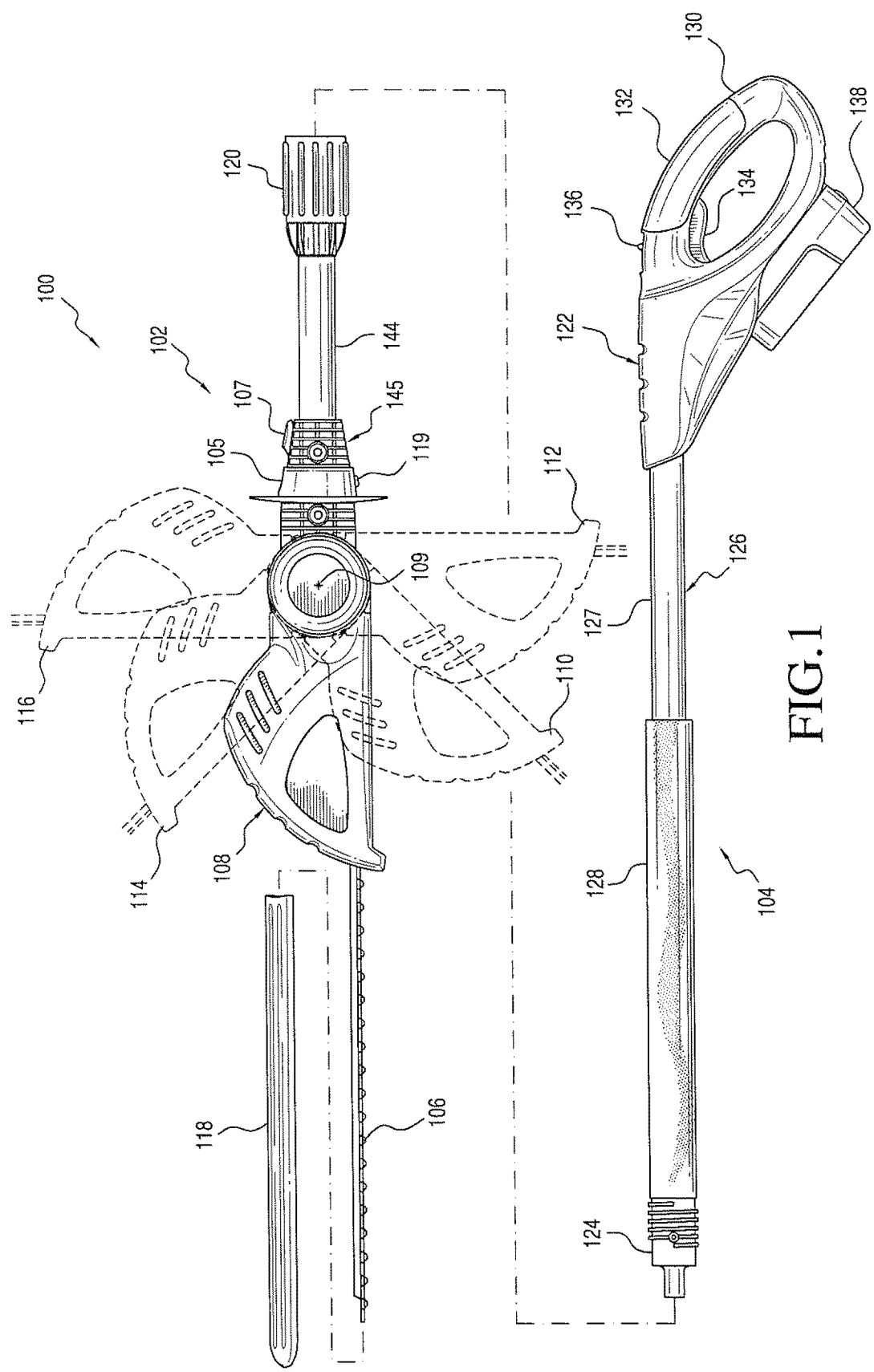
FIG. 1 is a side view of a portable trimmer showing connection of a head module to a handle module, according to an embodiment of the present invention.

With reference now to the figures, and in particular FIG. 1, a preferred embodiment of portable trimmer 100 is illustrated in accordance with the teachings of the present invention. Portable trimmer 100 has a head module 102, which is removably connected to power control module 104. Head module 102 provides power to trimming blade 106, which is a cutting tool, through rotatable power head 108. As illustrated, power head 108 is set in a neutral position along the longitudinal axis of head module 102. The power head 108 is rotatable about head assembly axis 109, and is selectively settable in plural positions through releasable engagement of latch 107 in head support 145. Latch 107 and the hand of an operator are protected by hand guard 105, which is secured to head support 145 by way of a fastening member 119. The fastening member 119 is preferably a set screw.

According to the preferred embodiment, power head 108 is selectively settable in the neutral position, a 45 degree flexion position 110, a 90 degree flexion position 112, a 45 degree dorsiflexion position 114, and a 90 degree dorsiflexion position 116. Accordingly, there are two 45 degree positions, namely: the 45 degree flexion position 110 and the 45 degree dorsiflexion position 114; and two 90 degree positions, namely: the 90 degree flexion position 112, and the 90 degree dorsiflexion position 116. It should be understood that these angular positions are preferred, but that they can be set to any predetermined angle. According to an alternate embodiment, power head 108 only rotates from the neutral position into positions of flexion, such as the 45 degree flexion position 110 and the 90 degree flexion position 112. According to yet another alternate embodiment, power head 108 only rotates from the neutral position into positions of dorsiflexion, such as the 45 degree dorsiflexion position 114 and the 90 degree dorsiflexion position 116.

During rotation of power head 108 or during storage of portable trimmer 100, trimming blade 106 is covered by removable blade sheath 118. Head module 102 includes a head coupling 120 for removable engagement with power control module 104. The head module 120 is connected to head support 145 by head extension pole 144.

Power control module 104 has a control handle assembly 122 at a proximal end thereof for gripping and control of portable trimmer 100 by an operator. Control handle assembly 122 is connected to elongated boom 126, which in turn is connected to handle coupling 124. Elongated boom 126 has a gripper section 128 surrounding pole section 127 to enhance gripping of portable trimmer 100 by the operator. According to the preferred embodiment, gripper section 128 is a flexibly deformable material such as foam rubber, but may be any material to enhance gripping. Handle coupling 124 releasably engages with head coupling 120 to structurally connect head module 102 to power control module 104. Handle coupling 124 also forms an electrical connection with head coupling 120 for transmitting electrical power.

Control handle assembly 122 has a handle 130 for controlling operation of portable trimmer 100. Mating surface 132 is disposed about an upper surface area of handle 130 to increase friction with the hand of the operator and thereby provide increased control. Control handle assembly 122 also has a manual switch 134 for controlling distribution of power to head module 102. Safety locking latch 136 is disposed about an upper periphery of control handle assembly 122 for releasably engaging manual switch 134. An operator may control safety locking latch 136 with the thumb to thereby release manual switch 134 and initiate operation of portable trimmer 100. Safety locking latch 136 is engaged each time the operator seeks to operate manual switch 134. Battery module 138, which is an electrical power unit, is releasably engaged to the underside of control handle assembly 122 to provide power to portable trimmer 100.

FIG. 2 is a view of portable trimmer 100 in a hedge trimming operation. Portable trimmer 100 is illustrated with power head 108 disposed in the 90 degree flexion position 112 during a top hedge trimming operation of hedges 140. Power head 108 is locked in position to thereby prevent further rotation about head assembly axis 109. Operator 142 controls portable trimmer 100 by grasping handle 130 and gripper section 128.

FIG. 3 is a view of portable trimmer 100 in a grass trimming operation. Portable trimmer 100 is illustrated with power head 108 disposed in the 45 degree dorsiflexion position 114 during a grass trimming operation of grass 143. Power head 108 is locked so that it does not rotate about head assembly axis 109. Similar to the hedge trimming operation, operator 142 controls portable trimmer 100 by grasping handle 130 and gripper section 128.

Figure 4:
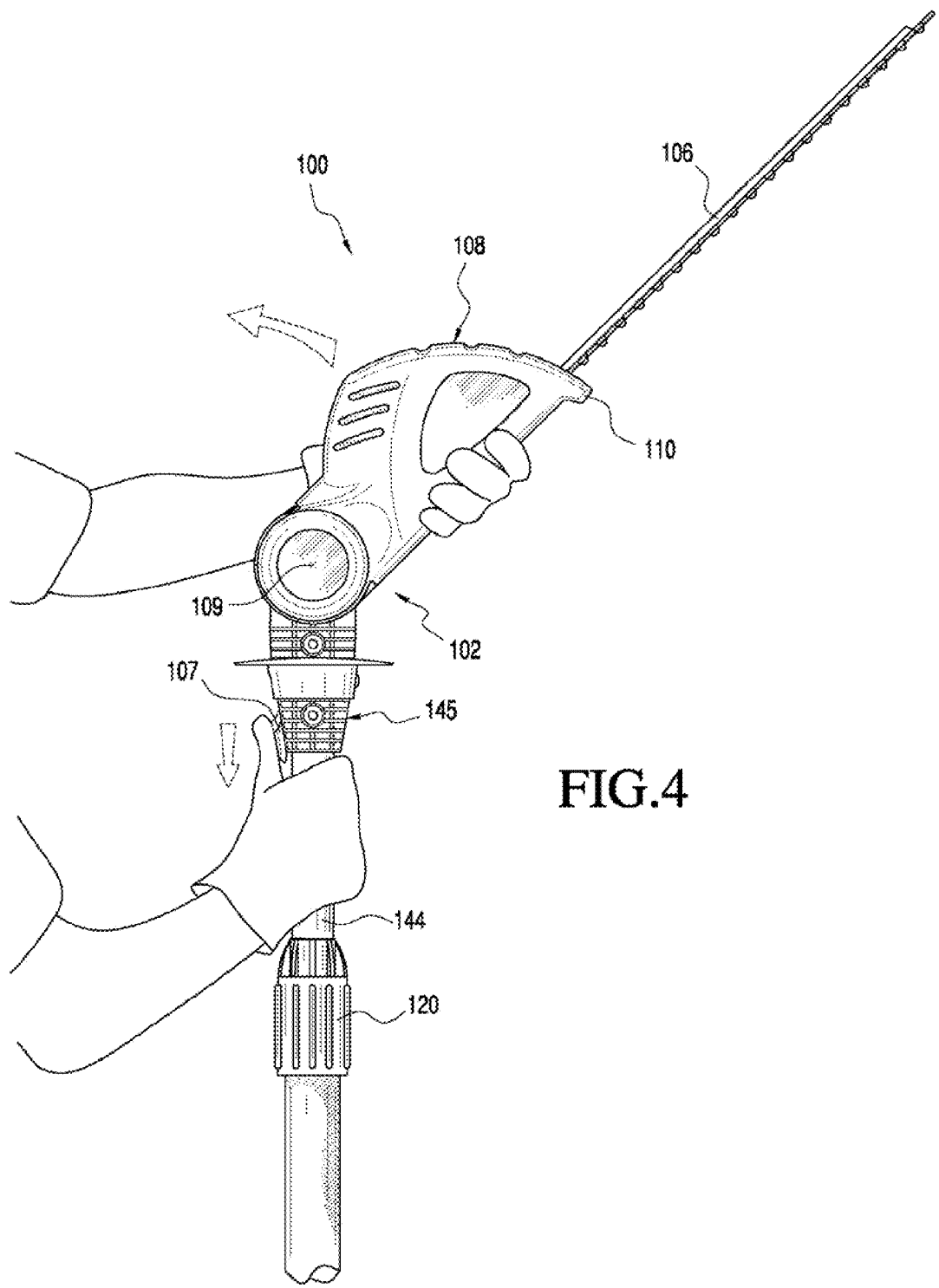
FIG. 4 is a side view of the portable trimmer showing the head module during rotation of a power head with respect to a head support.

FIG. 4 shows the repositioning of a rotatable power head 108 from the 45 degree flexion position 110 toward the neutral, i.e. straight, position. The operator grasps power head 108 with one hand and grasps head extension pole 144 with the other hand while disengaging latch 107 through movement in the illustrated downward position. Latch 107 is slidably recessed within head support 145. Once power head 108 is rotated into the desired position, such as the neutral position, the latch 107 is released.

Figure 5:
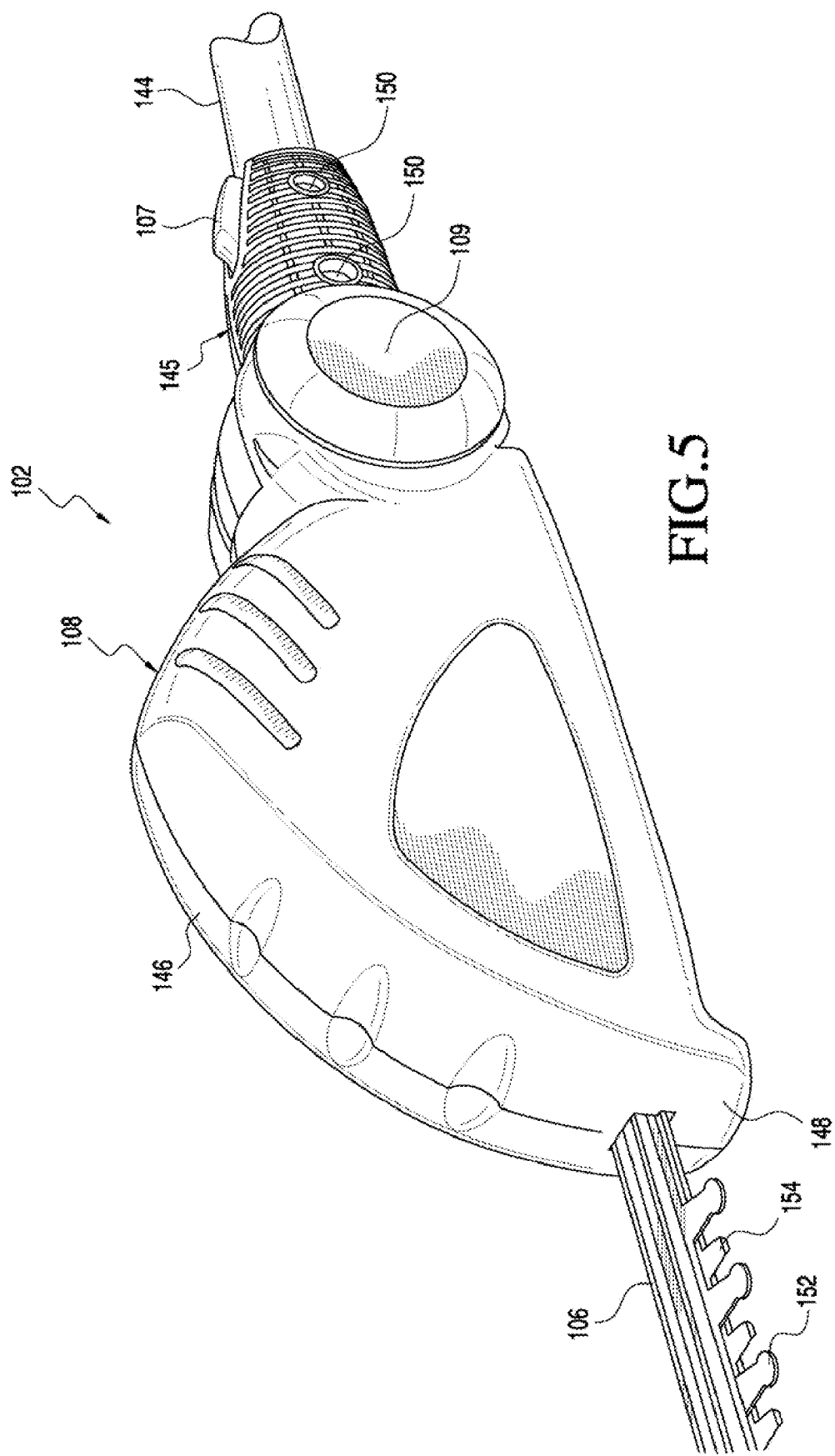
FIG. 5 is a perspective view of the head module with the power head disposed in the neutral position.

FIG. 5 is a perspective view of portable trimmer 100 with power head 108 in the neutral position. Hand guard 105 has been removed for clarity. Trimming blade 106, which is a cutting tool, has a plurality of stationary blade elements 152 and a plurality of reciprocating blade elements 154. Blade elements 152 cooperate with blade elements 154 to provide the cutting action. Trimming blade 106 is received within power head 108, which is formed in clamshell like fashion, by first matable section 146 and a second matable section 148. The matable sections 146, 148 are joined by a plurality of fastening members, which are described in detail below. The fastening members are preferably received by corresponding molded lugs within power head 108. Head assembly axis 109 provides a point of rotation for power head 108 and head support 145. The power head 108 is set in one of a plurality of predetermined positions with respect to head support 145 through engagement of latch 107. Head extension pole 144 is fixedly attached to head support 145 by way of fastening members 150. The fastening members 150 are preferably rivets, but may take other forms known in the art, such as screws.

Figure 6:
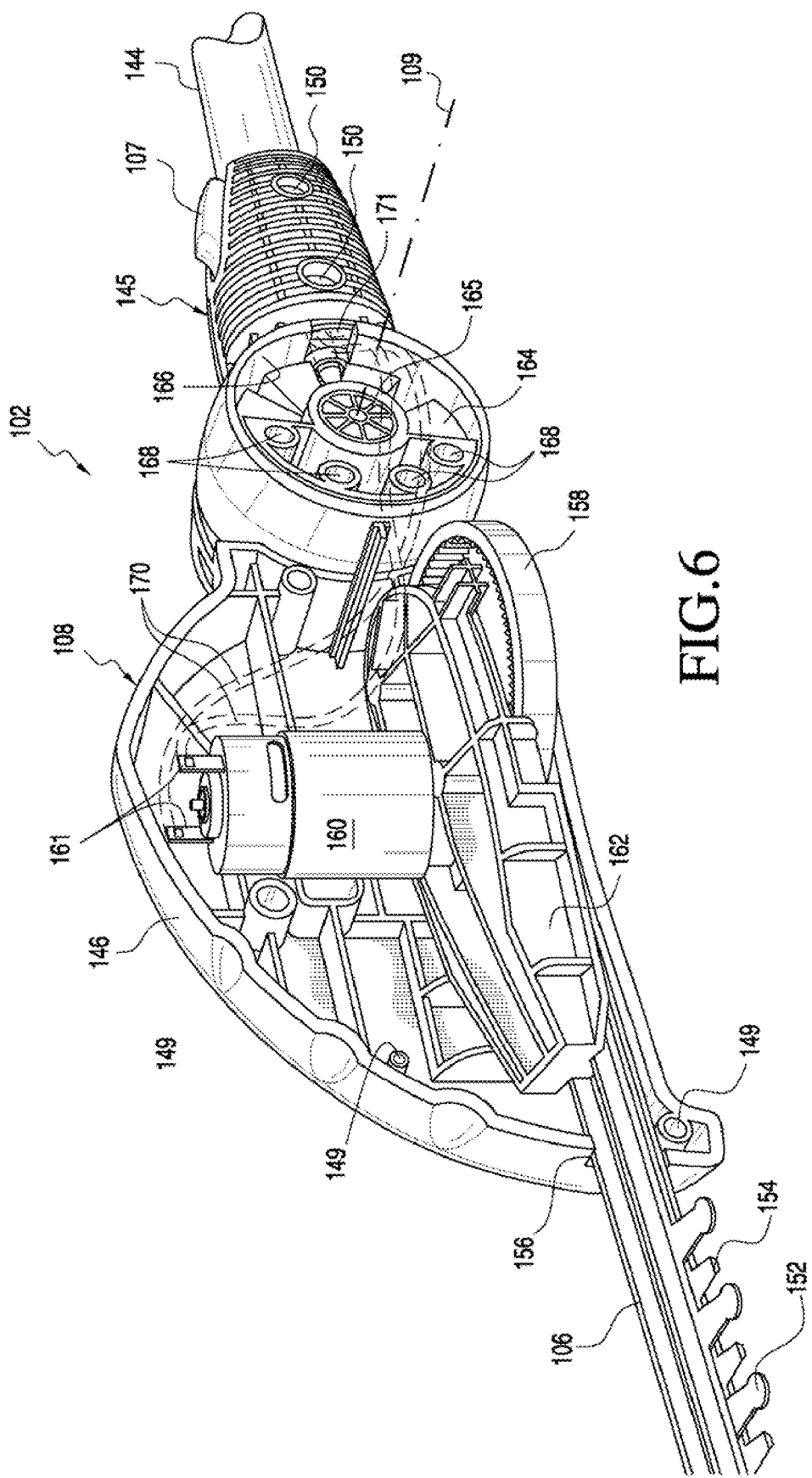
FIG. 6 is a sectional view of the head module illustrated in FIG. 5.

FIG. 6 is a sectional view of FIG. 5 showing the head module 102 with power head 108 in the neutral position. As illustrated, trimming blade 106 is received within molded blade recess 156 of first matable section 146. Likewise, trimming blade 106 is also received within a corresponding-molded blade recess of second matable section 148 (section removed for clarity). Trimming blade 106 reciprocates in response to movement of spur gear 158. Likewise, spur gear 158 is engaged with and receives power from motor 160. Trimming blade 106, motor 160, and spur gear 158 are supported by motor mount 162, which in turn is held in place through engagement with matable sections 146, 148. The first and second matable sections 146, 148 include a plurality of molded lugs 149, described in greater detail below, for receiving respectively corresponding fastening members.

Figure 7:
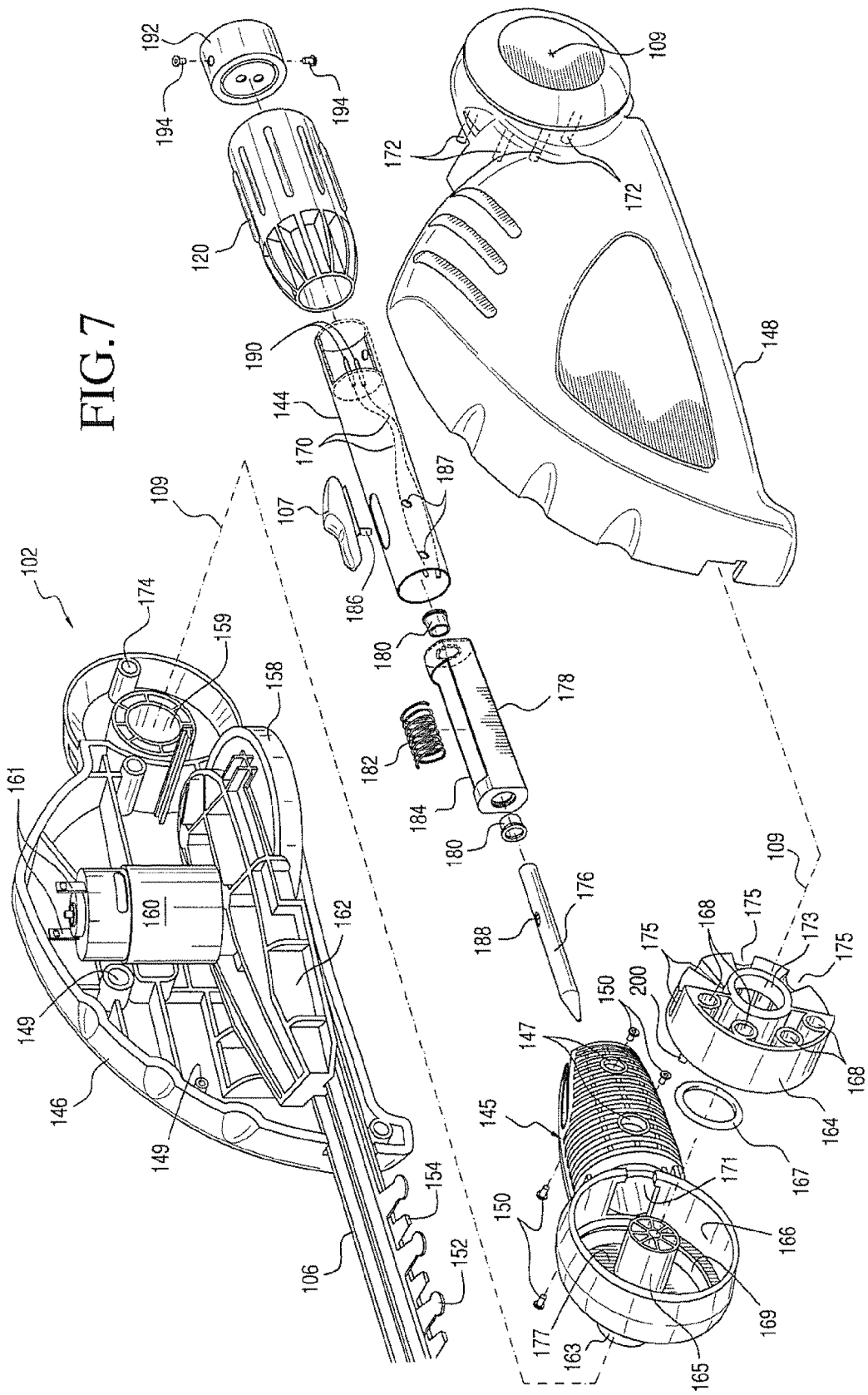
FIG. 7 is an exploded perspective view of the trimmer head module.

Now referring to FIGS. 6 and 7, head support 145 rotates with respect to power head 108 upon disengagement of latch 107. In order to define head assembly axis 109 as an axis of rotation, stator cartridge 164 remains fixed to first and second matable sections 146, 148 by a plurality of fastening members, described in detail below. Stator cartridge 164 is also disposed within interior receiving chamber 166 of head support 145. The head support 145 includes a distal pivot arm 163 that is received within molded socket 159 of first matable section 146. Likewise, proximal pivot arm 165 of head support 145 is received within molded socket 173 of stator cartridge 164. O-ring 167 is disposed about pivot arm 165 to increase friction between stator cartridge 164 and interior receiving chamber 166. O-ring 167 provides increased stability and friction during rotation of power head 108 with respect to head support 145.

Stator cartridge 164 freely rotates within interior receiving chamber 166 of head support 145, but remains stationary with respect to first matable section 146 and second matable section 148. In particular, a plurality of fastening members 196 (illustrated in FIGS. 10 and 11) connect slots 168 of stator cartridge 164 to molded lugs 172 of second matable section 148. Likewise, a fastening member 198 (illustrated in FIGS. 10 and 11) connects slot 174 of first matable section 146 to molded lug 200 of stator cartridge 164 by passing through semi-circular aperture 169 defined in molded plate 177 of head support 145.

The head support 145 is locked into a predetermined position with respect to power head 108 by latch 1,07. In particular, extension pin 186 of latch 107 is connected to pin aperture 188 of engagement pin 176 to control linear movement thereof. The engagement pin 176 is selectably received within a plurality of engagement recesses 175 within stator cartridge 164. The plurality of engagement recesses 175 correspond to selectable positions of power head 108, namely: the neutral position, the 45 degree flexion position 110, the 90 degree flexion position 112, the 45 degree dorsiflexion position 114, and the 90 degree dorsiflexion position 116. Alternate embodiments corresponding to alternate selectable degree positions of power head 108 are provided by altering the placement of engagement recesses 175 in stator cartridge 164. For example, engagement recesses 175 may be provided such that power head 108 is settable at positions of 30 degree flexion, 60 degree flexion, 30 degree dorsiflexion, 60 degree dorsiflexion, or the like.

Engagement pin 176 is received within and linearly moves with respect to cradle 178. Engagement pin 176 is stabilized within cradle 178 by way of a pair of alternately disposed collars 180. Biasing member 182 is received within cradle 178 and urges engagement pin 176 for selective engagement with the plurality of engagement recesses 175 within stator cartridge 164. Cradle 178 has a defined opening 184 in the top thereof for insertion of biasing member 182. Defined opening 184 also permits movement of latch 107 with respect to engagement pin 176, and in particular, permits insertion of extension pin 186 of latch 107 into pin aperture 188 of engagement pin 176. As illustrated, cradle 178 is disposed within head extension pole 144.

The head extension pole 144 is permanently affixed to head support 145. In particular, fastening members 150 are first inserted into slots 147 of head support 145. The fastening members 150 are then affixed into fastening apertures 187 of head extension pole 144. According to a preferred embodiment, fastening members 150 are rivets, but may take other forms known in the art, such as screws.

With reference to FIGS. 7-9, head coupling 120 includes a head electrical connection unit 190, which is formed by a pair of electrical connection pins. The head electrical connection unit 190 is retained within head extension pole 144 by way of insertion into electrical collar 192. According to a preferred embodiment, the electrical pins are retained within electrical collar 192 by way of fastening elements 194, which are preferably rivets. Thus, to form an electrical connection path, electrical leads 170 are respectively attached to head electrical connection unit 190, are threaded through head extension pole 144, and then threaded through interior channel 171 of head support 145 and into a chamber defined by first and second matable sections 146, 148, for ultimate attachment to electrical attachment pins 161 of motor 160.

FIG. 8 is a sectional view of power head 108 of head module 102 locked in the neutral position with power control module 104 poised for connection to head module 102. Power head 108 remains locked through insertion of engagement pin 176 into a selected engagement recess 175a of stator cartridge 164. Biasing member 182 urges engagement pin 176 into the selected engagement recess 175a when latch 107 is released by the operator. Head coupling 120 defines a threaded recess 206 to receive threaded male engagement section 208 of handle coupling 124. Head coupling 120 is slidable and rotatable about extension pole 144 to engage the handle coupling 124. Accordingly, the pins forming head electrical connection unit 190 are received within corresponding electrical receptacle 210 of handle coupling 124, and head coupling 120 is rotated to secure the connection.

FIG. 9 is a sectional view of the power head 108 of FIG. 8 illustrating dorsiflexion rotation about head assembly axis 109. As illustrated, latch 107 is attached to engagement pin 176 through insertion of extension pin 186 into pin aperture 188. When latch 107 is moved away from hand guard 105, engagement pin 176 releases from engagement with selected engagement recess 175a of stator cartridge 164 to disengage power head 108. The power head 108 is then rotated through flexion or dorsiflexion into another selected position. When latch 107 is released by the operator, biasing member 182 urges engagement pin into another selected engagement recess 175.

Figure 10:
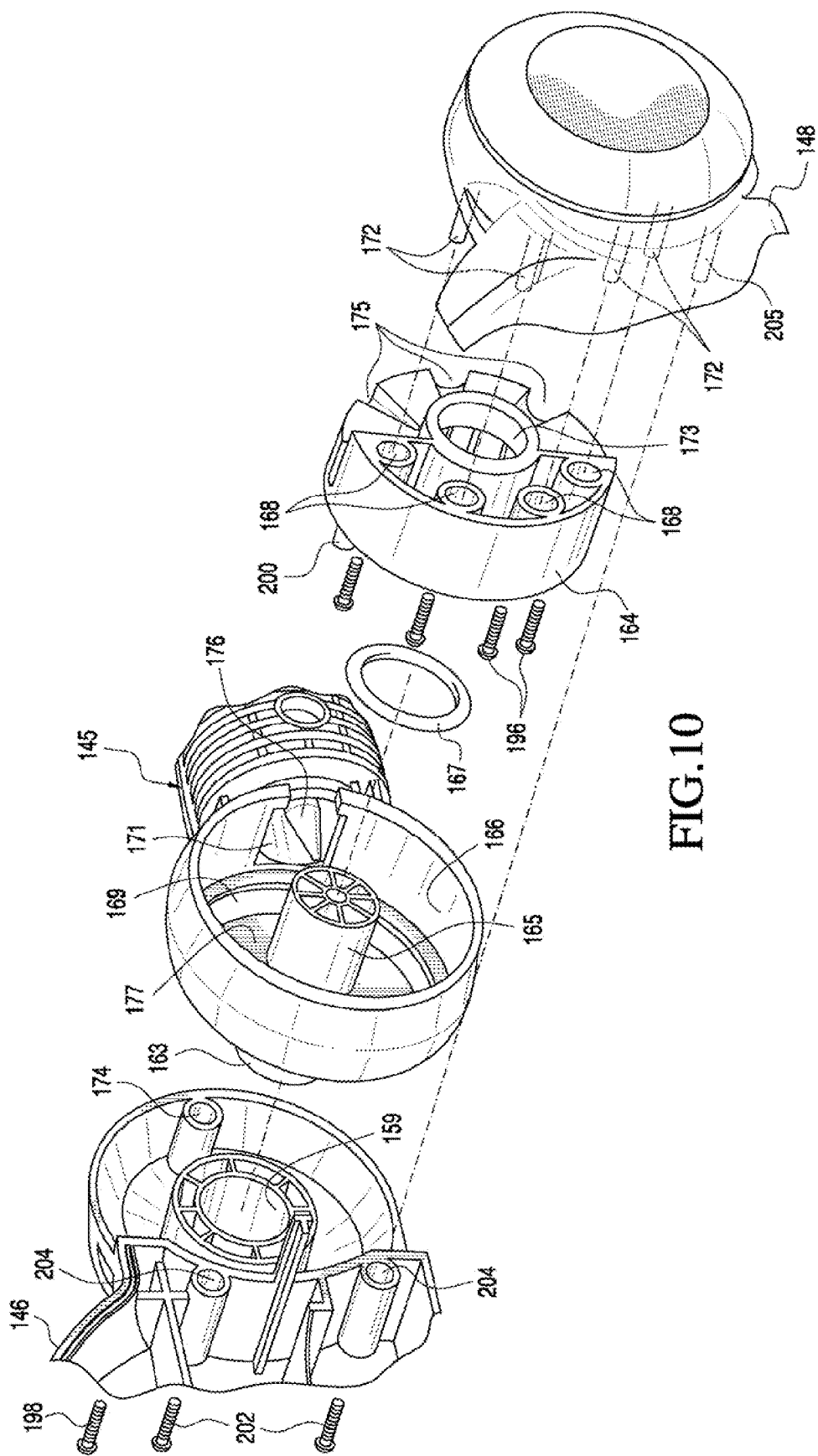
FIG. 10 is an exploded perspective view of the power head matable sections, stator cartridge, and head support.
Figure 11:
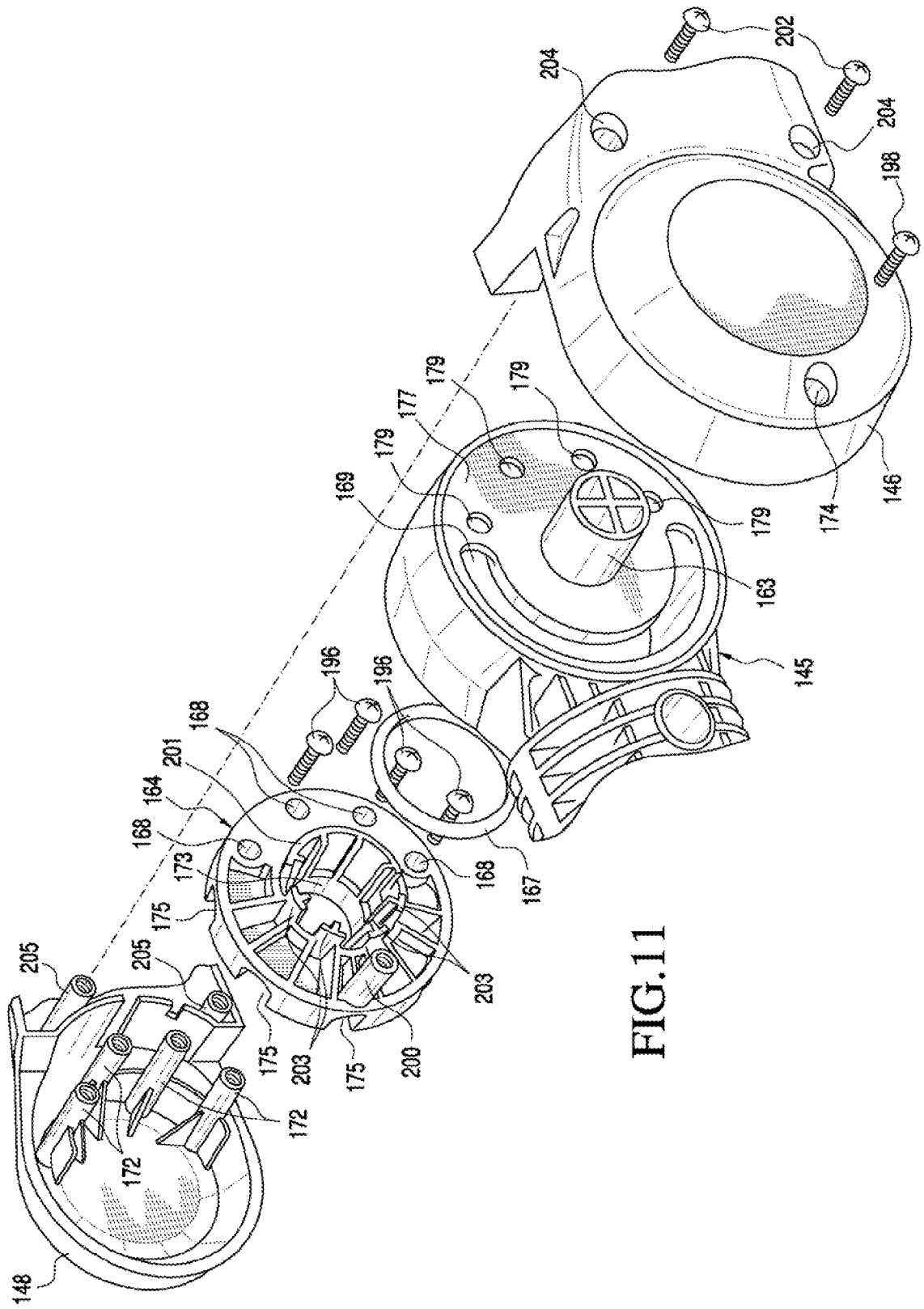
FIG. 11 is an exploded perspective view of the power head matable sections, stator cartridge, and head support illustrated in FIG. 10 from an opposite perspective.

FIGS. 10 and 11 show exploded sectional views of the first and second matable sections 146, 148 of power head 108, stator cartridge 164, and head support 145 from opposite perspectives. Stator cartridge 164 remains statically connected to first matable section 146 and second matable section 148. In particular, fastening members 196 are fixedly received within slots 168 of stator cartridge 164 and are joined to molded lugs 172 of second matable section 148 to thereby form a static connection. According to a preferred embodiment, fastening members 196 are screws. Likewise, fastening member 198 is fixedly received within slot 174 of first matable section 146 and is joined to molded lug 200 of stator cartridge 164. The first matable section 146 is also directly connected to second matable section 148 by a plurality of fastening members 202. In particular, fastening members 202 are fixedly received within slots 204 of first matable section 146 and are joined to molded lugs 205 (particularly shown in FIG. 11) of second matable section 148.

Head support 145 includes molded plate 177, which is continuously joined to a predetermined side of interior receiving chamber 166. Pivot arms 163 and 165 protrude perpendicularly from molded plate 177. In order to support rotation of head support 145 with respect to power head 108, pivot arm 165 of head support 145 is rotationally disposed within molded socket 173 of stator cartridge 164, and pivot arm 163 of head support 145 is rotationally disposed within molded socket 159 of first matable section 146.

Molded plate 177 of head support 145 also defines semi-circular aperture 169. Accordingly, molded lug 200 of stator cartridge 164 passes through semi-circular aperture 169 and moves arcuately with respect thereto during rotation of head support 145. O-ring 167 is disposed about pivot arm 165 and increases friction contact between stator cartridge 164 and head support 145. In particular, O-ring 167 contacts molded plate 177 and pivot arm 165 of head support 145, and also contacts arcuate projection 201 and T-shaped projections 203 of stator cartridge 165. A plurality of apertures 179 are also defined within molded plate 177 of head support 145 to facilitate tightening of fastening members 196 into respectively corresponding molded lugs 172 in second matable section 148. According to a preferred embodiment, fastening members 196, 198, and 202 are screws. Alternately, fastening members 196, 198, and 202 may be rivets, living-hinge type fittings, or combinations thereof providing a static connection.

Figure 12:
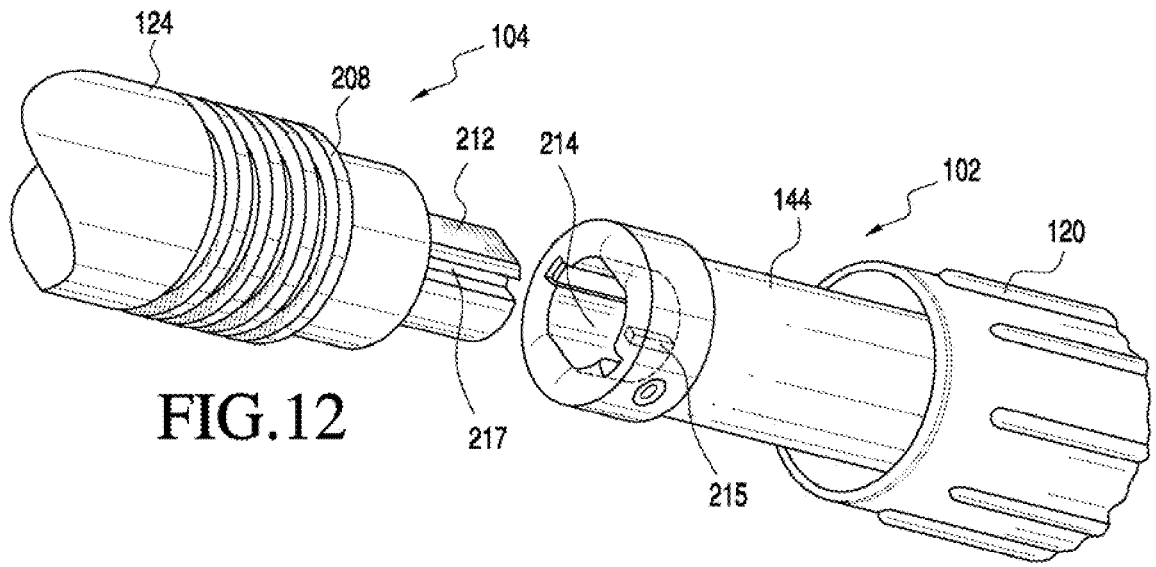
FIG. 12 is a detailed perspective view of the handle module poised for connection to the power control module.

FIG. 12 is a perspective view of power control module 104 poised for connection to head module 102. In particular, handle coupling 124 of power control module 104 has a male extension 212 for insertion into female receiver 214 of head coupling 120. The female receiver 214 includes a rail 215 to mate with a corresponding recess 217 in male extension 212. Head coupling 120 defines a threaded recess 206 (see FIGS. 8 and 9) to receive threaded male engagement section 208 of handle coupling 124. Head coupling 120 is slidable and rotatable about extension pole 144 to engage the handle coupling 124 and secure the connection.

Figure 13:
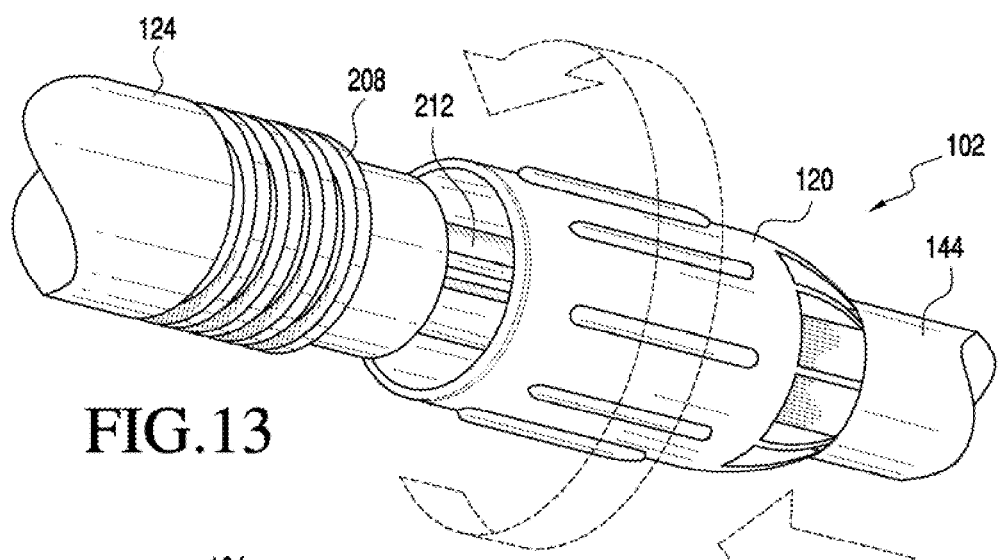
FIG. 13 is a detailed perspective view showing rotatable connection of the handle module to the power control module.

FIG. 13 is a perspective view illustrating rotatable connection of head module 102 to power control module 104. Upon insertion of male extension 212 into female receiver 214, head coupling 120 is rotated about threaded male engagement section 208 to provide a static connection between power control module 104 and head module 102.

Figure 14:
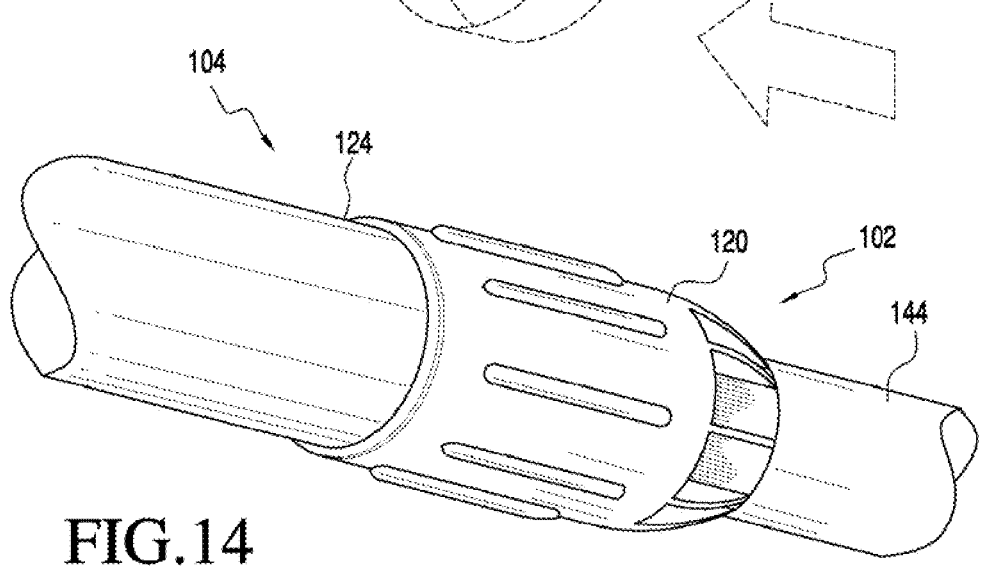
FIG. 14 is a detailed perspective view of the handle module statically connected to the power control module.

FIG. 14 is a perspective view illustrating power control module 104 in static connection with head module 102.

Figure 15:
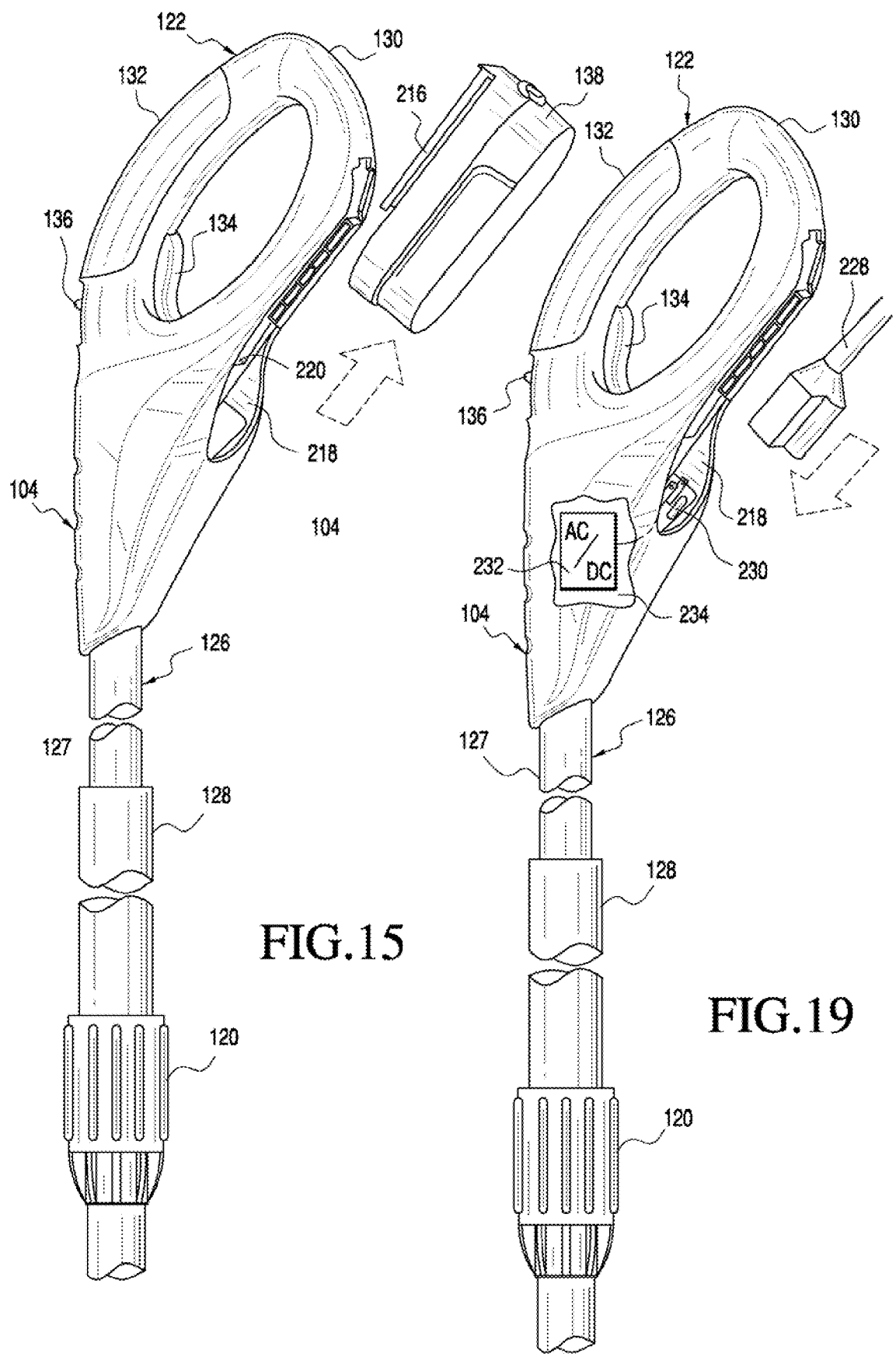
FIG. 15 is a perspective view of a battery module being removed from the power control module of the portable trimmer.

FIG. 15 is a perspective view of battery module 138 being released from engagement with control handle assembly 122 of power control module 104. Battery module 138 includes a channel projection 216 for engagement with elongated recess 218 in control handle assembly 122. Electrical contacts on battery module 138 provide an electrical connection to electrical contacts 220 within elongated recess 218

Figure 16:
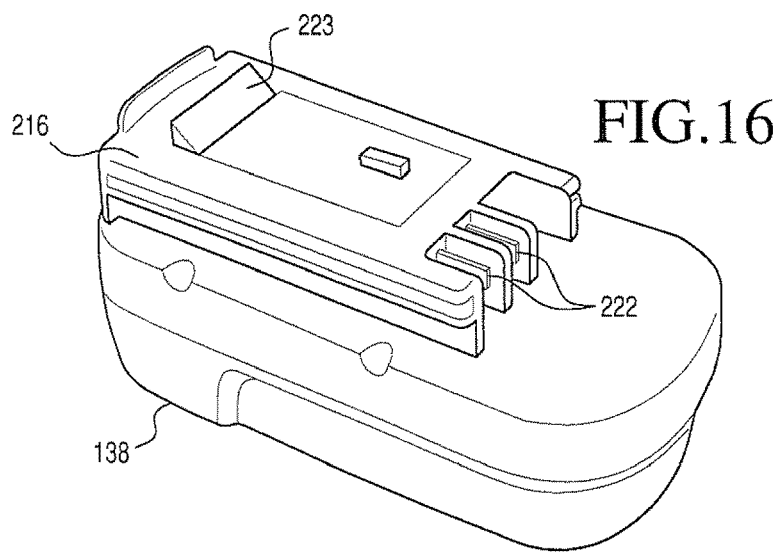
FIG. 16 is a perspective view of the battery module with electrical contacts exposed.

FIG. 16 is an elevated perspective view of battery module 138 illustrating channel projection 216 and plural electrical contacts 222. Engagement projection 223 releasably engages with a corresponding element in control handle assembly 122. According to an embodiment, battery module 138 houses a rechargeable battery power supply (not shown). According to embodiments of the invention, the battery power supply is 12 volts, 14 volts, 18 volts, 24 volts, 28 volts, or 36 volts. According to a preferred embodiment, the battery power supply is an 18 volt rechargeable battery.

Figure 17:
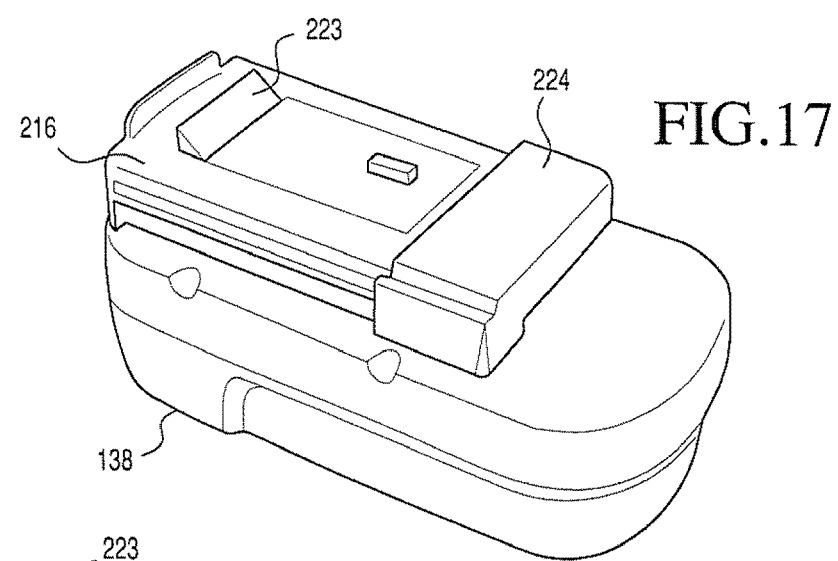
FIG. 17 is a perspective view the battery module with a removable battery cap covering the electrical contacts.

FIG. 17 is an elevated perspective view of the battery module 138 of FIG. 16 with battery cap 224 covering the electrical contacts for storage.

Figure 18:
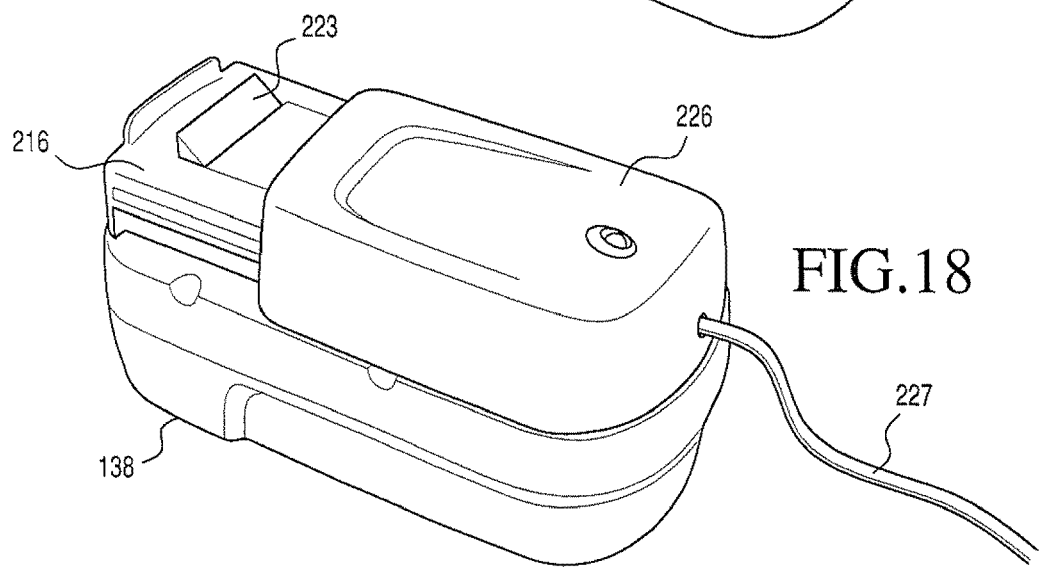
FIG. 18 is a perspective view of the battery module connected to a battery charging unit.

FIG. 18 is an elevated perspective view of the battery module 138 of FIG. 16 connected to battery charging unit 226. Battery charging unit 226 is connected to conventional household power by way of charging unit power cord 227. Battery charging unit 226 is configured and arranged to convert conventional AC house-hold power into DC power for charging battery module 138.

FIG. 19 is an elevated perspective view of control handle assembly 122 poised for electrical connection to AC power cord 228 according to an alternate embodiment of the present invention. As illustrated, electric power plug 230 is disposed within elongated recess 218 for connection with AC power cord 228. According to this embodiment, AC/DC converter 232 is disposed within interior chamber 234 of control handle assembly 122 and connected between electric power plug 230 and manual switch 134 to convert supplied AC power to 18 volt DC current for driving electric motor 160. AC/DC converter 232 in combination with the supplied AC power is an electrical power unit.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

We claim:

1. A hand-operated power tool, comprising:
    a power head having a housing enclosing an electric motor and at least partially enclosing a cutting tool operatively coupled to the electric motor;
    a head support connected to the power head and settable in a plurality of angular positions with respect to said power head, said head support having a head coupling including a head electrical connection unit electrically connected to the electric motor, at least one pivot arm that is rotationally received within a corresponding socket within said power head and an engagement pin for locking said head support into one of a plurality of selectable angular positions with respect to said power head;

an elongated boom terminating at a distal end with a handle coupling for releasable engagement with the head coupling, the handle coupling having an electrical receptacle for electrically connecting to the head electrical connection unit during the engagement; and a control handle assembly connected to a proximal end of said elongated boom and having a manual switch to control communication of electric power from an electrical power unit to a handle electrical connection unit during the engagement, whereby engagement of the manual switch controls mechanical operation of the cutting tool.

2. The hand-operated power tool according to claim 1, wherein the electrical power unit is a battery module including a rechargeable battery, the battery module being removably connected to said control handle assembly to provide electric power to the manual switch.

3. The hand-operated power tool according to claim 1, wherein the settable angular positions of said head support with respect to said power head include a neutral position representing 0 degree rotation, a 45 degree position, or a 90 degree position.

4. The hand-operated power tool according to claim 1, wherein the settable angular positions of said head support with respect to said power head include a neutral position representing 0 degree rotation, a flexion position, or a dorsiflexion position.

5. The hand-operated power tool according to claim 1, wherein the cutting tool partially enclosed by said power head is a trimming blade comprising a plurality of stationary blade elements and a plurality of reciprocating blade elements cooperating with the stationary blade elements to provide a cutting action in response to operation of the electric motor.

6. The hand-operated power tool according to claim 1, wherein the power head is in-line with the elongated boom.

7. The hand-operated power tool according to claim 1, wherein the power head includes a socket for receiving the head support, the head support being rotatable relative to the power head, and wherein the hand-operated power tool further comprises a stator cartridge notability disposed within an interior receiving chamber of the head support and fixably secured to the power head.

8. The hand-operated power tool according to claim 1, further comprising a second pivot arm that is rotationally received in a second corresponding socket within said power head.

9. A hand-operated power tool, comprising:

a power head having a housing enclosing an electric motor and at least partially enclosing a cutting tool operatively coupled to the electric motor;

a head support connected to the power head and settable in a plurality of angular positions with respect to said power head, said head support having a head coupling including a head electrical connection unit electrically connected to the electric motor;

an elongated boom terminating at a distal end with a handle coupling for releasable engagement with the head coupling, the handle coupling having an electrical receptacle for electrically connecting to the head electrical connection unit during the engagement; and a control handle assembly connected to a proximal end of said elongated boom and having a manual switch to control communication of electric power from an electrical power unit to a handle electrical connection unit during the engagement, whereby engagement of the manual switch controls mechanical operation of the cutting tool:

a stator cartridge disposed within and connected to the housing of said power head by a plurality of fastening members, said stator cartridge defining a plurality of recesses that are adapted to receive a movable engagement pin from said head support, wherein said power head is locked into a predetermined angular position with respect to said head support during engagement of the pin into a selected recess of the plurality of recesses; and a latch slidably mounted to an external surface of said head support and connected to the pin such that movement of said latch engages the pin with the selected recess, wherein the head support includes an interior chamber and the stator cartridge is rotatably secured within the interior chamber.

10. The hand-operated power tool according to claim 9, wherein the interior receiving chamber includes an interior channel that allows the engagement pin to access the recesses of the stator cartridge.

11. The hand-operated power tool according to claim 9, further comprising:

a biasing member disposed within an interior channel of said head support for urging the pin toward engagement with the selected recess.

* * * * *

UNITED STATES PATENT AND TRADEMARK OFFICE
CERTIFICATE OF CORRECTION

PATENT NO. : 7,752,760 B2
APPLICATION NO. : 11/169748
DATED : July 13, 2010
INVENTOR(S) : Ashok Samuel Baskar et al.

It is certified that error appears in the above-identified patent and that said Letters Patent is hereby corrected as shown below:

Claim 7, Column 9, line 40, please change "notability" to "rotability"

Signed and Sealed this

Seventeenth Day of August, 2010

David J. Kappos
*Director of the United States Patent and Trademark Office*